United States Patent
Lin et al.

(10) Patent No.: US 10,078,246 B2
(45) Date of Patent: Sep. 18, 2018

(54) DISPLAY PANEL

(71) Applicant: AU Optronics Corporation, Hsin-Chu (TW)

(72) Inventors: Chen-Chun Lin, Hsin-Chu (TW); Wei-Cheng Cheng, Hsin-Chu (TW); Yi-Chi Lee, Hsin-Chu (TW); Tien-Lun Ting, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/668,812

(22) Filed: Aug. 4, 2017

(65) Prior Publication Data

US 2018/0074376 A1 Mar. 15, 2018

(30) Foreign Application Priority Data

Sep. 14, 2016 (TW) .............................. 105129937 A

(51) Int. Cl.
| | |
|---|---|
| *G02F 1/1337* | (2006.01) |
| *G02F 1/1343* | (2006.01) |
| *G02F 1/1362* | (2006.01) |
| *G02F 1/1368* | (2006.01) |

(52) U.S. Cl.
CPC ...... *G02F 1/133707* (2013.01); *G02F 1/1368* (2013.01); *G02F 1/133723* (2013.01); *G02F 1/134309* (2013.01); *G02F 1/136286* (2013.01); *G02F 1/133788* (2013.01); *G02F 2001/133715* (2013.01); *G02F 2001/134318* (2013.01); *G02F 2001/134381* (2013.01); *G02F 2201/121* (2013.01); *G02F 2201/123* (2013.01); *G02F 2202/023* (2013.01)

(58) Field of Classification Search
CPC ......... G02F 1/133707; G02F 1/133723; G02F 1/134309
USPC ......................................................... 349/129
See application file for complete search history.

(56) References Cited

U.S. PATENT DOCUMENTS

| | | | |
|---|---|---|---|
| 2002/0131003 A1* | 9/2002 | Matsumoto | ........... G02F 1/1345 349/139 |
| 2005/0110924 A1* | 5/2005 | Kim | .................. G02F 1/133707 349/111 |
| 2005/0231666 A1* | 10/2005 | Kim | .................. G02F 1/133555 349/114 |
| 2008/0036931 A1* | 2/2008 | Chan | ................. G02F 1/133707 349/38 |
| 2008/0143905 A1 | 6/2008 | Wu et al. | |
| 2013/0242219 A1 | 9/2013 | Yun et al. | |

(Continued)

*Primary Examiner* — Lucy Chien
(74) *Attorney, Agent, or Firm* — WPAT, PC

(57) ABSTRACT

A display panel includes a pixel electrode and a common electrode. The pixel electrode has a cross-shaped opening which includes a first slit extending along a first direction and a second slit extending along a second direction and crossing the first slit. The common electrode is at least disposed at one side of the pixel electrode. The common electrode includes an opening having a largest width in the first direction, and a part of the opening with the largest width is adjacent to an intersection of an extending direction of the first slit and the common electrode. A width of the opening is gradually smaller from the part of the opening with the largest width along the second direction and an opposite direction of the second direction.

20 Claims, 14 Drawing Sheets

(56) References Cited

U.S. PATENT DOCUMENTS

2013/0258262 A1* 10/2013 Lee .................. G02F 1/133707
349/123
2017/0052396 A1 2/2017 Cheng et al.

* cited by examiner

DISPLAY PANEL

BACKGROUND

Technical Field

The present invention relates to a display panel, and in particular, to a liquid crystal display panel.

Related Art

With the rapid development of display technologies, consumers have higher requirements on image quality of displays. In addition to requirements on specifications of resolution, color saturation, and response time of displays, requirements on specifications of contract ratio also become higher with the time.

Therefore, persons skilled in the field of displays have developed Polymer-stabilized alignment (PSA) liquid crystal display panels, so as to improve the contrast ratios and viewing angles of the liquid crystal display panels. A method for manufacturing a PSA liquid crystal display panel includes: adding photopolymerizable monomers to a liquid crystal material, applying a voltage to the liquid crystal material after assembling a liquid crystal panel, so as to enable liquid crystal molecules to generate pre-tilt angles, and appropriately irradiating ultraviolet light to fix the pre-tilt angles, so as to stabilize a polymer. By means of the alignment technology, dark-state light leakage of a liquid crystal display panel can be greatly improved, response time is shortened, and an objective of a wide viewing angle is achieved. However, in a traditional PSA display panel, a pixel electrode is formed by a cross-shaped main portion and branch portions extending from sides of the main portion, and therefore, liquid crystal molecules tilt, from the outside to the inside, towards the main portion. The liquid crystal molecules tilt along extending directions of the branch portions, and therefore, at intersections of the branch portions extending along different directions, that is, a position of the main portion, liquid crystal alignment directions are inconsistent, resulting in that the liquid crystal molecules adjacent to the main portion are more prone to be irregularly aligned, thereby causing a decrease in liquid crystal efficiency. This leads to disclination lined on pixels when being observed from a microscopic perspective, and leads to a decrease in transmittance when being observed from a macroscopic perspective, thereby causing a decrease in display quality.

SUMMARY

An objective of the present invention is to provide a display panel, which reduces areas with disclination lines and improves the transmittance by disposing an opening in a common electrode and enabling a width of the opening to be gradually smaller from a part of the opening with a largest width along two opposite directions.

An embodiment of the present invention provides a display panel, including a first substrate, a switch, a pixel electrode, and a common electrode. The switch is disposed on the first substrate. The pixel electrode is disposed on the first substrate and electrically connected to the switch. The pixel electrode has a cross-shaped opening which includes a first slit extending along a first direction and a second slit extending along a second direction and crossing the first slit. The common electrode is disposed on the first substrate and at least disposed at one side of the pixel electrode. The common electrode includes an opening having a largest width in the first direction, a part of the opening with the largest width is adjacent to an intersection of an extending direction of the first slit and the common electrode, and a width of the opening in the first direction is gradually smaller from the part of the opening with the largest width along the second direction and an opposite direction of the second direction.

Another embodiment of the present invention provides a display panel, including a first substrate, a switch, a pixel electrode, and a common electrode. The switch is disposed on the first substrate. The pixel electrode is disposed on the first substrate and electrically connected to the switch. The pixel electrode has a cross-shaped opening which includes a first slit extending along a first direction and a second slit extending along a second direction and crossing the first slit. The common electrode is disposed on the first substrate, and at least disposed at one side of the pixel electrode. The common electrode includes a first portion and a second portion that respectively extend along the second direction, the first portion has a first side and a second side, the second portion has a third side and a fourth side, and the first side, the second side, the third side, and the fourth side together form an opening, the opening having a largest width in the first direction.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

To make the present invention more comprehensible to a person of ordinary skill in the art, features and effects of the present invention are described in detail below through exemplary embodiments of the present invention with reference to the accompanying drawings.

Figure 1:
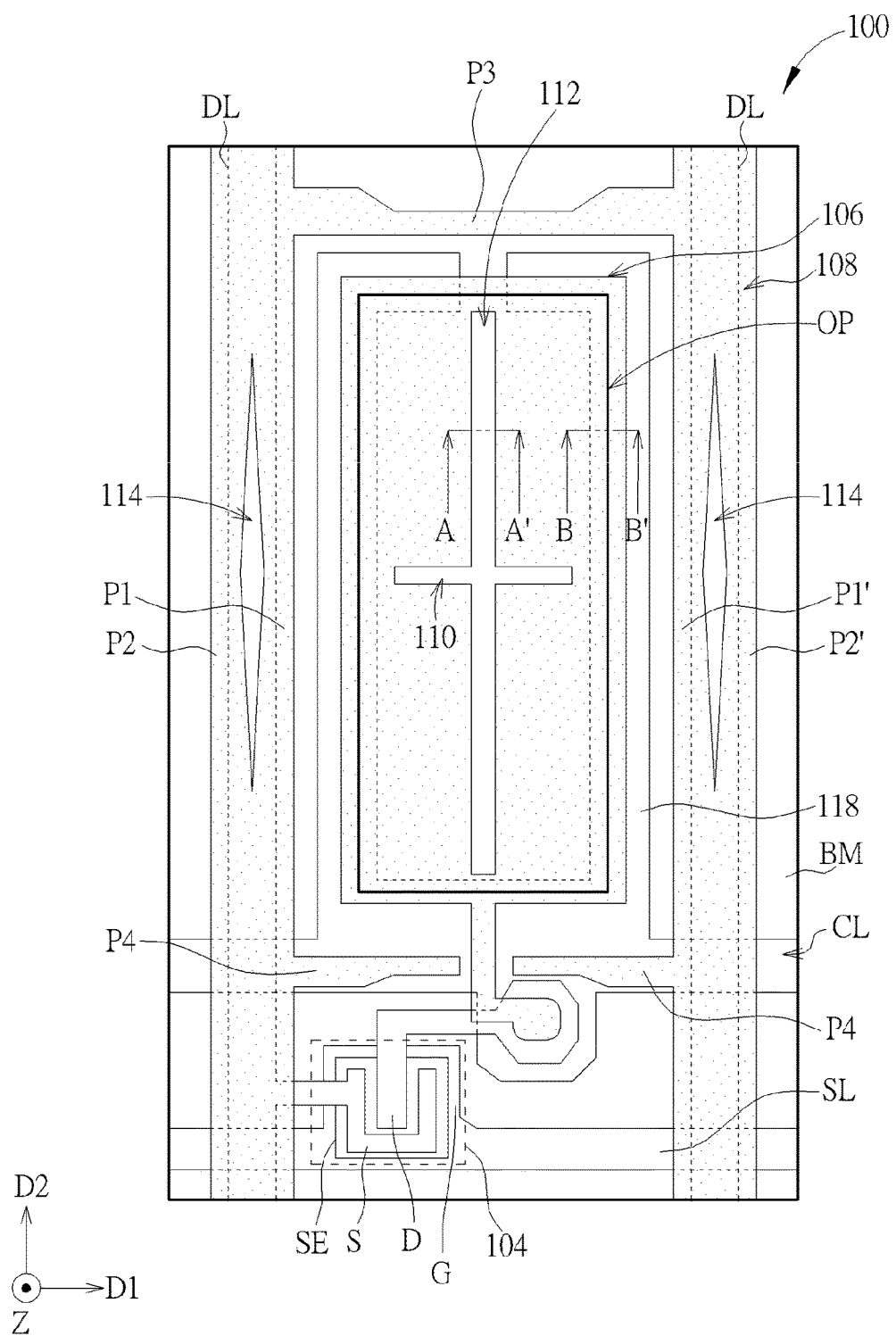
FIG. 1 is a top view of a display panel according to a first embodiment of the present invention.
Figure 2:
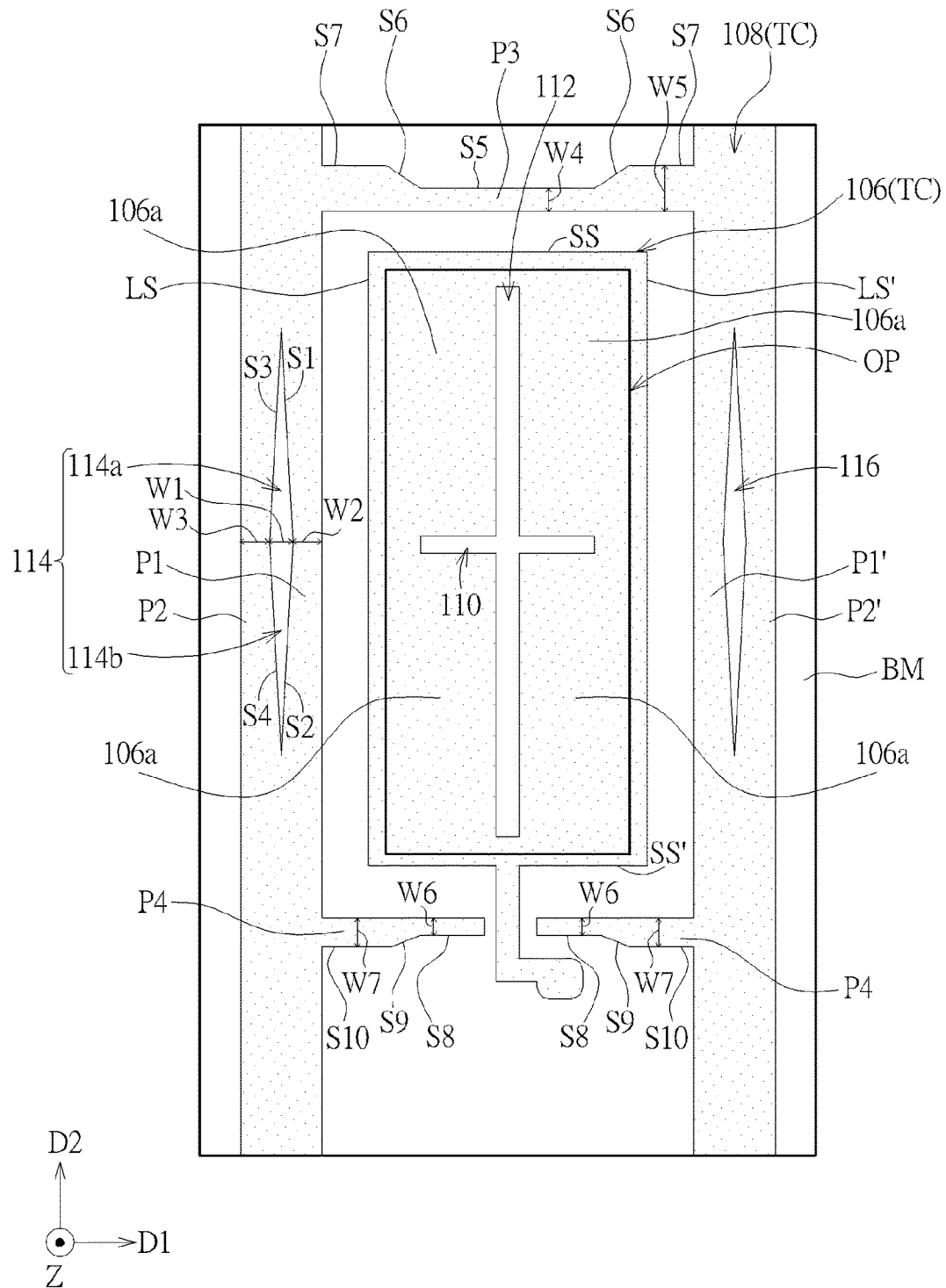
FIG. 2 is a top view of a pixel electrode and a common electrode of the display panel according to the first embodiment of the present invention.
Figure 3:
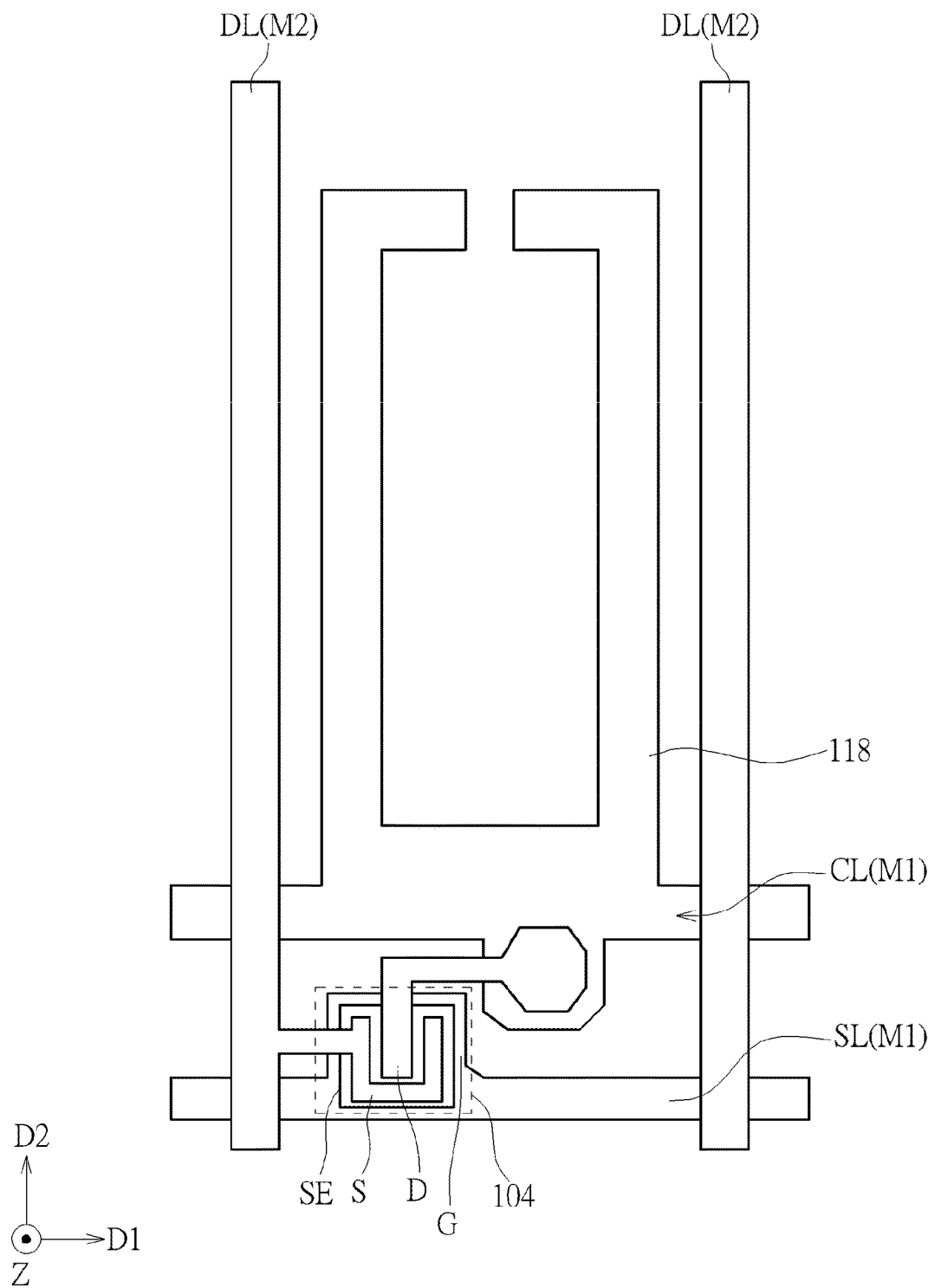
FIG. 3 is a top view of a switch, data lines, a scan line, and a common line of the display panel according to the first embodiment of the present invention.
Figure 4:
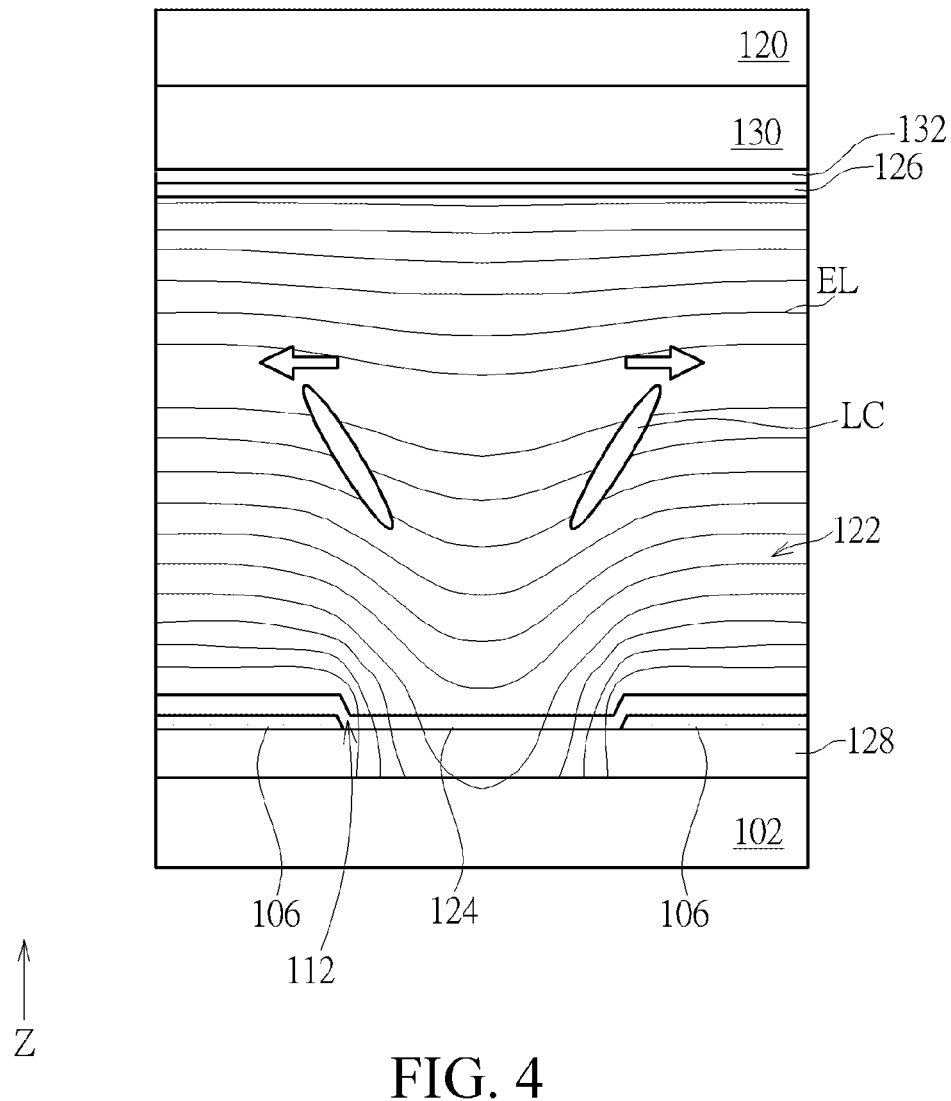
FIG. 4 is a sectional view taking along the line A-A' according to FIG. 1.
Figure 5:
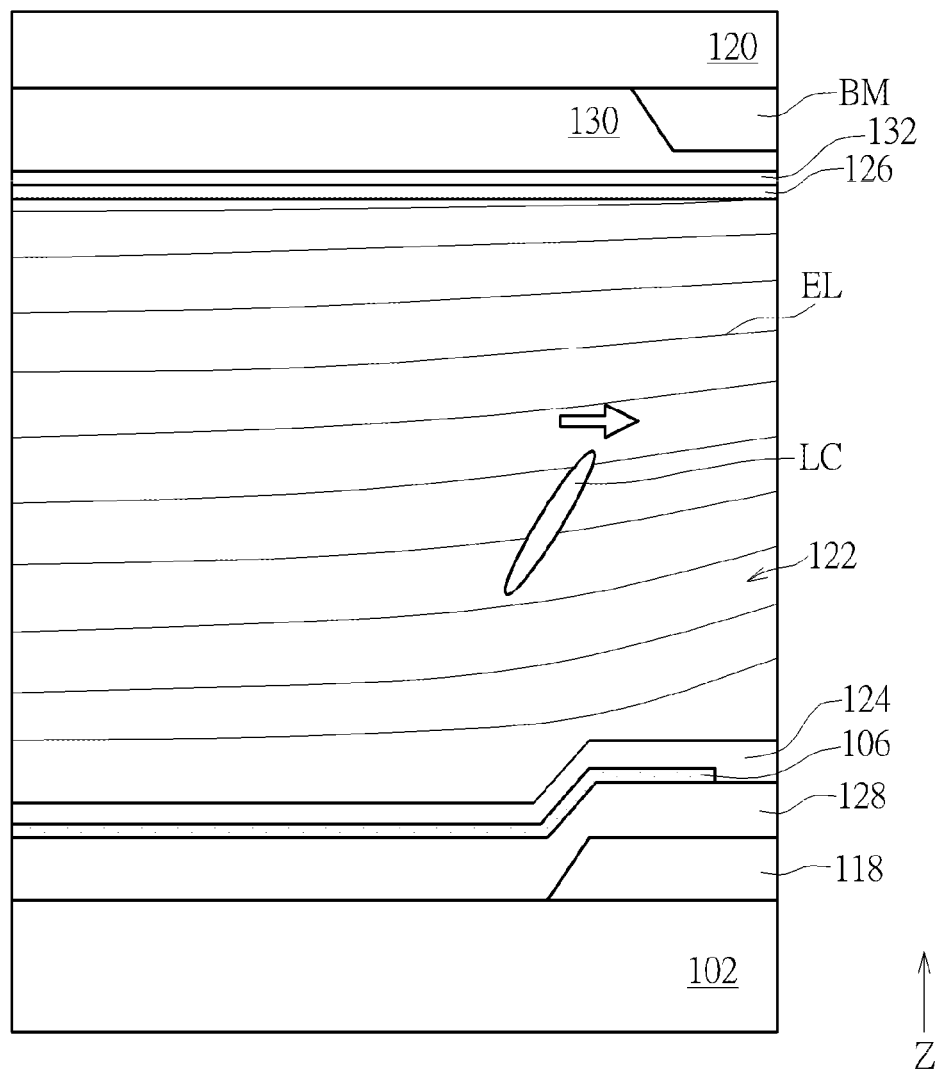
FIG. 5 is a sectional view taking along the line B-B' according to FIG. 1.
Figure 6:
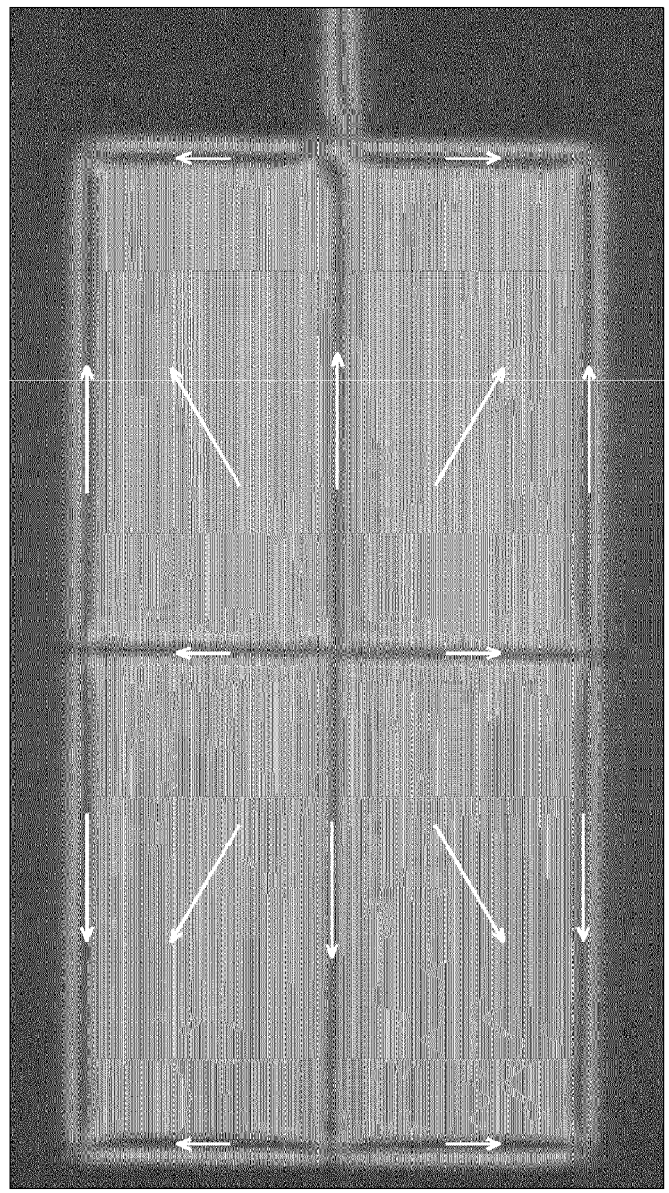
FIG. 6 is an optical microscope image of the display panel according to the first embodiment of the present invention.

Referring to FIG. 1 to FIG. 6, FIG. 1 is a top view of a display panel according to a first embodiment of the present invention, FIG. 2 is a top view of a pixel electrode, a common electrode, and a black matrix of the display panel according to the first embodiment of the present invention, FIG. 3 is a top view of a switch, data lines, a scan line, and a common line of the display panel according to the first embodiment of the present invention, FIG. 4 is a sectional view along the line A-A' of FIG. 1, FIG. 5 is a sectional view along the line B-B' of FIG. 1, and FIG. 6 is an optical microscope image of the display panel according to the first embodiment of the present invention. The drawings of the present invention are merely illustrative, so as to facilitate the comprehension of the present invention, and the detailed proportions thereof may be adjusted according to design requirements. Moreover, to clearly describe the structure of the present invention, the drawings merely show a single pixel unit. First, as shown in FIG. 1, FIG. 2, and FIG. 4, a display panel 100 in this embodiment may include a first substrate 102, a switch 104, a pixel electrode 106, and a common electrode 108. The first substrate 102 may include a transparent substrate such as a glass substrate, a plastic substrate, an acrylic substrate, a quartz substrate, a sapphire substrate, or another suitable rigid substrate or flexible substrate. The switch 104, the pixel electrode 106, and the common electrode 108 are disposed on the first substrate 102. The pixel electrode 106 is electrically connected to a drain D of the switch 104, and the pixel electrode 106 has a cross-shaped opening that divides the pixel electrode 106 into four electrode blocks 106a. Specifically, the cross-shaped opening includes a first slit 110 extending along a first direction D1 and a second slit 112 extending along a second direction D2 and crossing the first slit 110. An intersection of the first slit 110 and the second slit 112 is preferably located at a center of the pixel electrode 106, so that the electrode blocks 106a divided by the first slit 110 and the second slit 112 can have approximately equal sizes, but the present invention is not limited thereto. In another embodiment, the electrode blocks 106a divided by the first slit 110 and the second slit 112 may have different sizes. In this embodiment, the electrode blocks 106a may be an electrode of a whole surface without slits. The display panel 100 may further include a black matrix BM, including an opening OP, disposed opposite to the pixel electrode 106, so that light transmitted through the pixel electrode 106 can be emitted from the opening OP, thereby displaying a single color.

The common electrode 108 is at least disposed at one side of the pixel electrode 106. In this embodiment, the common electrode 108 includes an opening 114, disposed at one side of the pixel electrode 106. The opening 114 has a largest width W1 in a first direction D1. A part of the opening 114 with the largest width W1 is adjacent to an intersection of an extending direction of the first slit 110 and the common electrode 108. A width of the opening 114 in the first direction D1 may be gradually smaller from the part of the opening 114 with the largest width W1 along the second direction D2 and an opposite direction of the second direction D2. In other words, the common electrode 108 may include a first portion P1 and a second portion P2 that respectively extend along the second direction D2. The first portion P1 and the second portion P2 are disposed at one side of the pixel electrode 106, and the first portion P1 is disposed between the pixel electrode 106 and the second portion P2. Further, the first portion P1 has a first side S1 and a second side S2, the second portion P2 has a third side S3 and a fourth side S4, and the first side S1, the second side S2, the third side S3, and the fourth side S4 together form the opening 114. Preferably, the first portion P1 and the second portion P2 may be disposed in a manner of facing a long side LS of the pixel electrode 106, so that the opening 114 is disposed at the side of the long side LS of the pixel electrode 106. Specifically, the first side S1 and the second side S2 of the first portion P1 are disposed opposite to a side of the first portion P1 facing the pixel electrode 106, and the third side S3 and the fourth side S4 of the second portion P2 are disposed in a manner of facing the pixel electrode 106. Moreover, the first side S1, the second side S2, the third side S3, and the fourth side S4 are not parallel to the first direction D1 and the second direction D2, so that the opening 114 formed by the first side S1, the second side S2, the third side S3, and the fourth side S4 is located in the common electrode 108. For example, the first side S1, the second side S2, the third side S3, and the fourth side S4 may be straight sides respectively. Therefore, the first portion P1 and the second portion P2 have a smallest width W2 and a smallest width W3 in the first direction D1 respectively, parts of the first portion P1 and the second portion P2 with the smallest widths W2, W3 are adjacent to the intersection of the extending direction of the first slit 110 and the common electrode 108, and widths of the first portion P1 and the second portion P2 in the first direction D1 are gradually larger from the parts with the smallest widths W2, W3 along the second direction D2 and the opposite direction of the second direction D2 respectively. For example, the smallest widths W2, W3 of the first portion P1 and the second portion P2 in the first direction D1 may be greater than or equal to 2 micrometers respectively. In addition, the first portion P1 and the second portion P2 are preferably symmetrical with respect to the second direction D2, and the smallest widths W2, W3 thereof are preferably the same.

In this embodiment, the opening 114 may include a first opening 114a and a second opening 114b that are disposed at two sides of the intersection. In another embodiment, the opening 114 may include a first opening 114a and a second opening 114b that are symmetrical with respect to the intersection, and the first opening 114a and the second opening 114b are in communication with each other. That is, the first side S1 and the third side S3 are two sides of the first opening 114a respectively, and the second side S2 and the fourth side S4 are two sides of the second opening 114b respectively. Moreover, in one embodiment, the first side S1 and the second side S2 may be symmetrical with respect to the extending direction of the first slit 110, the third side S3 and the fourth side S4 may be symmetrical with respect to the extending direction of the first slit 110, the first side S1 is connected to the second side S2, and the third side S3 is connected to the fourth side S4. A distance between the first side S1 and the third side S3 is gradually smaller along the second direction D2, so that a width of the first opening 114a in the first direction D1 is gradually smaller from a part of the first opening 114a with the largest width W1 along the second direction D2 to become a smallest width. A distance between the second side S2 and the fourth side S4 is gradually smaller along the opposite direction of the second direction D2, so that a width of the second opening 114b in the first direction D1 is gradually smaller from a part of the second opening 114b with the largest width W1 along the opposite direction of the second direction D2 to become the smallest width. In this embodiment, the smallest width may be zero, that is, the first side S1 and the third side S3 are connected at one end point, and the second side S2 and the fourth side S4 are connected at the other end point, so that the opening 114 is a rhombus, but the present invention is not limited thereto. For example, a distance between the end points (a width of the rhombus-shaped opening 114 along the second direction D2) may be between 1/10 and 10/10 of the length of the pixel electrode 106 in the second direction D2. When the width of the opening 114 in the second direction D2 is the length of the pixel electrode 106 in the second direction D2, the first portion P1 is not in contact with the second portion P2. In a variant embodiment, the smallest widths of the first opening 114a and the second opening 114b may be greater than zero and less than the largest width W1 respectively.

In this embodiment, the common electrode 108 may be disposed at two sides of the pixel electrode 106, that is, the common electrode 108 may include another opening 116, disposed at the other side of the pixel electrode 106, and the pixel electrode 106 is disposed between the two openings 114, 116. In other words, the common electrode 108 may include another first portion P1' and another second portion P2', the first portion P1' is disposed between the pixel electrode 106 and the second portion P2', and the pixel electrode 106 is located between the first portion P1 and the first portion P1'. Preferably, the first portion P1' and the second portion P2' are disposed in a manner of facing the other long side LS' of the pixel electrode 106. In this embodiment, the first portion P1' and the first portion P1 are symmetrical with respect to the second slit 112, and the second portion P2' and the second portion P2 are also symmetrical with respect to the second slit 112, and therefore, details of the structure is not described herein again. However, the present invention is not limited thereto.

Besides, the common electrode 108 may further include a third portion P3, disposed at another side of the pixel electrode 106. In this embodiment, the third portion P3 is disposed at a short side SS of the pixel electrode 106, and the third portion P3 is located between the two first portions P1, P1' and is connected to one end of the first portion P1 and one end of the first portion P1'. The third portion P3 may has a smallest width W4 in the second direction D2, a part of the third portion P3 with the smallest width W4 is adjacent to an intersection of the extending direction of the second slit 112 and the third portion P3, and a width of the third portion P3 in the second direction D2 is gradually larger from the part of the third portion P3 with the smallest width W4 along the first direction D1 and the opposite direction of the first direction D1. In other words, the third portion P3 may have a fifth side S5, two sixth sides S6, and two seventh sides S7. The fifth side S5, the sixth sides S6, and the seventh sides S7 are disposed opposite to a side of the third portion P3 facing the pixel electrode 106. The fifth side S5 may be symmetrical with respect to the extending direction of the second slit 112, and is approximately parallel to the first direction D1, and an area of the third portion P3 corresponding to the fifth side S5 has the smallest width W4 in the second direction D2. The sixth sides S6 are connected to two ends of the fifth side S5 respectively, and are not parallel to the first direction D1 and the second direction D2. Therefore, widths of areas of the third portion P3 corresponding to the sixth sides S6 in the second direction D2 gradually change along the first direction D1 and the opposite direction of the first direction D1. Each of the seventh sides S7 is respectively connected between the corresponding sixth side S6 and the corresponding first portion P1/P1', and is approximately parallel to the first direction D1. Therefore, an area of the third portion P3 corresponding to each of the seventh sides S7 has a largest width W5 in the second direction D2. In a variant embodiment, the third portion P3 may be connected to one end of the second portion P2 and one end of the second portion P2', so that when the first portions P1, P1' are not in contact with the second portions P2, P2', that is, the widths of the openings 114, 116 in the second direction D2 equal to the length of the pixel electrode 106 in the second direction D2, the first portion P1 is electrically connected to the second portion P2 by means of the third portion P3, and is electrically connected to the other first portion P1' and the other second portion P2'.

The common electrode 108 may further include two fourth portions P4, disposed at one side of the pixel electrode 106. In this embodiment, the fourth portions P4 are disposed at the other short side SS' of the pixel electrode 106, the two fourth portions P4 are located between the two first portions P1, P1' and respectively extend out from the other end of the first portion P1 and the other end of the first portion P1', and a gap exists between the two fourth portions P4, so that the pixel electrode 106 can be electrically connected to the drain D of the switch 104 by means of the gap. The fourth portions P4 may be symmetrical with respect to the extending direction of the second slit 112, each of the fourth portions P4 has a smallest width W6 in the second direction D2, a part of each of fourth portions P4 with the smallest width W6 is adjacent to the extending direction of the second slit 112, and widths of the fourth portions P4 in the second direction D2 are gradually larger from parts of the fourth portions P4 with the smallest widths W6 along the first direction D1 and the opposite direction of the first direction D1 respectively. In this embodiment, each of the fourth portions P4 may respectively have an eighth side S8, a ninth side S9, and a tenth side S10. The eighth side S8, the ninth side S9, and the tenth side S10 are located opposite to a side of the fourth portion P4 facing the pixel electrode 106. The eighth sides S8 may be symmetrical with respect to the extending direction of the second slit 112, and are approximately parallel to the first direction D1, and an area of the fourth portion P4 corresponding to each eighth side S8 has the smallest width W6 in the second direction D2. Each of the ninth sides S9 is connected to the corresponding eighth side S8, is located between the corresponding eighth side S8 and the corresponding first portion P1/P1', and is not parallel to the first direction D1 and the second direction D2. Therefore, widths of areas of the fourth portion P4 corresponding to the ninth sides S9 in the second direction D2 gradually change along the first direction D1 and the opposite direction of the first direction D1 respectively. Each of the tenth sides S10 is connected between the corresponding ninth side S9 and the corresponding first portion P1/P1', and is approximately parallel to the first direction D1. Therefore, an area of the fourth portion P4 corresponding to each of the tenth sides S10 has a largest width W7 in the second direction D2. In this embodiment, the common electrode 108 may surround most of the pixel electrode 106. The long sides LS, LS' of the pixel electrode 106 may be approximately parallel to the first direction D1, and the short sides SS, SS' may be approximately parallel to the second direction D2. In addition, a distance may exist between each of the first portions P1, P1' and the pixel electrode 106, between the third portion P3 and the pixel electrode 106, and between each of the fourth portions P4 and the pixel electrode 106. In an exemplary embodiment, the common electrode 108 and the pixel electrode 106 are spaced by uniform distances. The uniform distances described herein refer to that a tolerance of the distances is within ±10%. Besides, in this embodiment, the common electrode 108 and the pixel electrode 106 may be formed by a same patterned conductive layer TC, and therefore, the common electrode 108 may be electrically insulated from the pixel electrode 106 by means of the distances. For example, the patterned conductive layer TC may include a transparent conductive material such as indium tin oxide (ITO), indium zinc oxide (IZO), aluminum zinc oxide (AZO), aluminum indium oxide (AIO), indium oxide (InO), gallium oxide (GaO), and indium gallium zinc oxide (IGZO), carbon nanotubes, nanosilver particles, a metal or an alloy with a thickness less than 60 nanometers (nm), an organic transparent conductive material, or another suitable transparent conductive material.

Reference is made to FIG. 3, and to FIG. 1, FIG. 2, and FIG. 4 at the same time. The display panel 100 may further include data lines DL, a scan line SL, and a common line CL that are disposed on the first substrate 102. The data lines DL cross the scan line SL and the common line CL. For example, the scan line SL and the common line CL may extend along the first direction D1, and the data lines DL may extend along the second direction D2 that is not parallel to the first direction D1. The switch 104 includes a gate G, a semiconductor layer SE, a source S, and a drain D. The source S and the gate G of the switch 104 are electrically connected to a data line DL and the scan line SL respectively, and the drain D may overlap the common line CL to couple to the common line CL, so as to form a storage capacitor. In this embodiment, the gate G of the switch 104, the scan line SL, and the common line CL may be formed by a same first patterned metal layer M1, and the scan line SL and the common line CL are spaced. The source S and the drain D of the switch 104, and the data lines DL may be formed by a same second patterned metal layer M2. In this embodiment, the common electrode 108 may overlap the data lines DL in a vertical projection direction Z, and is spaced from the data lines DL by means of an insulation layer. The openings 114, 116 of the common electrode 108 may at least partially overlap, and preferably, completely overlap the data lines DL in the vertical projection direction Z respectively. In addition, in this embodiment, the common line 108 may selectively include a shield electrode 118, disposed along a side of the pixel electrode 106. A configuration relationship among the switch 104, the scan line SL, the data lines DL, the common line CL, and the storage capacitor in the present invention is not limited to the foregoing configuration relationship, and a person of ordinary skill in the art shall know these elements and therefore can make corresponding adjustments according to different requirements.

Referring to FIG. 4 and FIG. 5, FIG. 4 is a sectional view taken along a line A-A' according to FIG. 1, and FIG. 5 is a sectional view taken along a line B-B' according to FIG. 1. As shown in FIG. 4 and FIG. 5, the display panel 100 may further include a second substrate 120, a liquid crystal layer 122, a first PSA layer 124, and a second PSA layer 126. The second substrate 120 is disposed opposite to the first substrate 102. The liquid crystal layer 122 includes a plurality of liquid crystal molecules LC, disposed between the first substrate 102 and the second substrate 120. The pixel electrode 106 is disposed between the first substrate 102 and the liquid crystal layer 122, the first PSA layer 124 is disposed between the pixel electrode 106 and the liquid crystal layer 122, and the insulation layer 128 is disposed between the pixel electrode 106 and the first substrate 102. The display panel 100 may further include a color filter layer 130 and an opposite electrode 132. In this embodiment, the color filter layer 130 is located between the second substrate 120 and the opposite electrode 132, but the present invention is not limited thereto. In another embodiment, the color filter layer 130 may be disposed on the first substrate 102.

In the display panel 100 in this embodiment, the first PSA layer 124 and the second PSA layer 126 are used to provide an alignment anchoring force, so as to enable the liquid crystal molecules LC to have pre-tilt angles. A liquid crystal alignment method of the display panel 100 is described below. First, mix the liquid crystal molecules LC and photocurable monomers (not shown). Second, apply a first voltage to the common electrode 108, apply a second voltage to the pixel electrode 106, and apply a third voltage to the opposite electrode 132. Third, enable, by means of an electric field generated by the first voltage, the second voltage, and the third voltage, the liquid crystal molecules LC to tilt to the pre-tilt angles. Fourth, polymerize, by means of illumination, the photocurable monomers to respectively form the first PSA layer 124 and the second PSA layer 126 on the first substrate 102 and the second substrate 120, so as to fix the pre-tilt angles of the liquid crystal molecules LC. Fifth, remove the electric field to form the display panel 100. In this embodiment, a difference between the first voltage and the third voltage is greater than a difference between the second voltage and the third voltage, for example, the difference between the first voltage and the third voltage is 8 V, and the difference between the second voltage and the third voltage is 5 V. It should be noted that the pixel electrode 106 has the cross-shaped opening, and distribution of equipotential lines (ELs) thereof is as shown in FIG. 4 and FIG. 5. Therefore, during the alignment process, the liquid crystal molecules LC corresponding to the cross-shaped opening generally tilt outwards (the long sides and the short sides of the pixel electrode) according to a direction of the electric field, thereby reducing a width of a cross-shaped disclination line. Besides, in this embodiment, the width of the first portion P1 corresponding to the first opening 114$a$ in the first direction D1 is gradually larger along the second direction D2, and the width of the first portion P1 corresponding to the second opening 114$b$ in the first direction D1 is gradually larger along the opposite direction of the second direction D2. Therefore, when the liquid crystal molecules LC are aligned, an electric field effect is generated among the common electrode 108, the pixel electrode 106, and the opposite electrode 132, so that the liquid crystal molecules LC in a boundary area of the pixel electrode 106 tilt from a position of the opening 114 with the largest width W1 to the second direction and the opposite direction of the second direction respectively, thereby alleviating the problem of a disclination line at the long side LS of the pixel electrode 106. In addition, the common electrode 108 further includes the first portion P1', the first portion P1' and the first portion P1 are symmetrical with respect to the second slit 112, and the pixel electrode 106 is disposed between the two first portions P1, P1', and therefore, the problem of a disclination line at the long side LS' of the pixel electrode 106 can also be alleviated. Besides, the first portion P1 and the second portion P2 are disposed between adjacent pixel electrodes 106, and therefore, when the liquid crystal molecules LC are aligned, the second portion P2 can facilitate the uniform and consistent alignment of liquid crystal molecules LC of another subpixel.

It should be noted that the display panel 100 in this embodiment may further include two alignment layers (not shown), a material of the alignment layers may be polyimide, for example, and the two alignment layers are respectively located between the pixel electrode 106 and the first PSA layer 124 and between the opposite electrode 132 and the second PSA layer 126.

Reference is made to FIG. 6, and to FIG. 2 at the same time. When the display panel 100 displays a frame, a pixel voltage is applied to the pixel electrode 106, and a common voltage is applied to the common electrode 108. For example, the pixel voltage is 7.5 V, and the common voltage is a ground voltage. In this embodiment, alignment directions of the liquid crystal molecules LC of the display panel 100 may be shown as arrows in FIG. 6. In other words, by means of influences of structural design of the display panel 100 and the distribution of the ELs thereof, the liquid crystal molecules LC corresponding to the cross-shaped opening generally tilt outwards from the first slit 110 and the second slit 112. The liquid crystal molecules LC of the four electrode blocks 106a of the pixel electrode 106 tilt towards four corners of the pixel electrode 106, thereby reducing a width of a disclination line at an intersection (the cross-shaped opening) of adjacent electrode blocks 106a, and effectively reducing areas with disclination lines. Moreover, the liquid crystal molecules LC adjacent to the area of the opening 114 generally tilt from a position of the opening 114 with the largest width W1 to the second direction D2 and the opposite direction of the second direction D2 respectively. In this way, the liquid crystal efficiency can be improved, and the transmittance of the display panel 100 and the quality of display frames are improved. It should be noted that in this embodiment, the common electrode 108 overlaps the data lines DL in the vertical projection direction Z, and the common electrode 108 has the openings 114 and 116, so that the load effect of the data lines DL can be improved. Besides, in this embodiment, the black matrix BM overlaps the long sides LS, LS' and the short sides SS, SS' of the pixel electrode 106 in the vertical projection direction Z, and therefore, a disclination line around the corresponding pixel electrode 106 can be shielded by the black matrix BM, thereby enabling the displayed subpixel to show uniform brightness.

Figure 7:
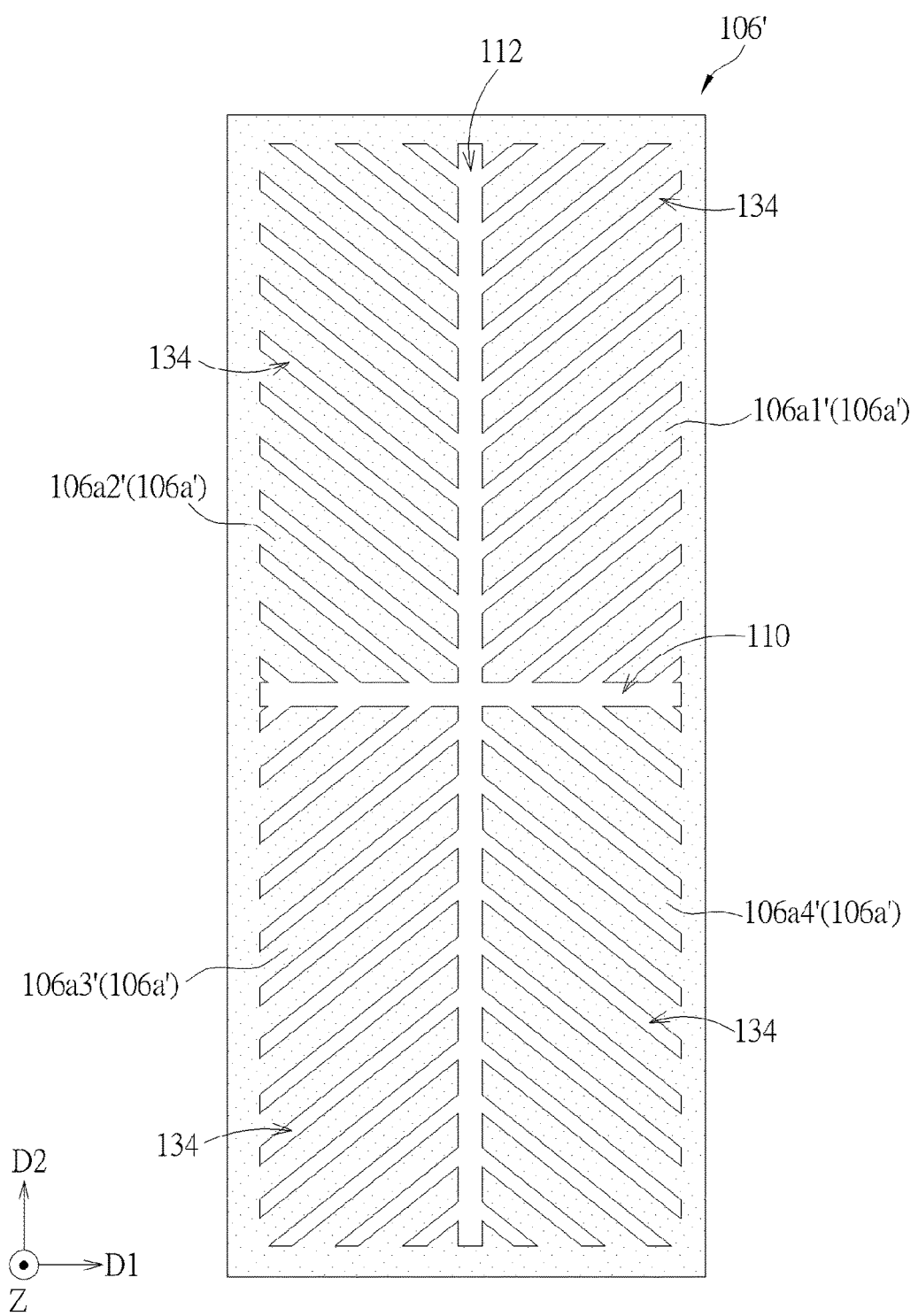
FIG. 7 is a top view of a display panel according to a variant embodiment of the first embodiment of the present invention.

Referring to FIG. 7, FIG. 7 is a top view of a display panel according to a variant embodiment of the first embodiment of the present invention. As shown in FIG. 7, this variant embodiment differs from the foregoing first embodiment in that each of the electrode blocks 106a' of the pixel electrode 106' in this variant embodiment may include a plurality of branch slits 134, and the branch slits 134 in one electrode block 106a' are parallel to each other. Specifically, the electrode blocks 106a' may be divided into a first electrode block 106a1', a second electrode block 106a2', a third electrode block 106a3', and a fourth electrode block 106a4'. The branch slits 134 in the first electrode block 106a1' are parallel to each other, and extend from the first slit 110 or the second slit 112 with an angle between the branch slits 134 and the first direction D1 being greater than 0° and less than 90°. Therefore, the first slit 110 and the second slit 112 are not parallel. The branch slits 134 in the third electrode block 106a3' are parallel to each other, and extend from the first slit 110 or the second slit 112 along a direction opposite to the extending direction of the branch slits 134 in the first electrode block 106a1'. In this embodiment, the branch slits 134 in the third electrode block 106a3' are parallel to the branch slits 134 in the first electrode block 106a1'. The branch slits 134 in the second electrode block 106a2' are parallel to each other, and extend from the first slit 110 or the second slit 112 with an angle between the branch slits 134 and the first direction D1 being between 90° and 180°. Therefore, branch slits 134 in the second electrode block 106a2' are not parallel to the first slit 110, the second slit 112, and the branch slits 134 in the first electrode block 106a1'. The branch slits 134 in the fourth electrode block 106a4' are parallel to each other, and extend from the first slit 110 or the second slit 112 along a direction opposite to the extending direction of the branch slits 134 in the second electrode block 106a2'. In this embodiment, the branch slits 134 in the fourth electrode block 106a4' are parallel to the branch slits 134 in the second electrode block 106a2'. Preferably, angles between the first direction D1 and the branch slits 134 in the first electrode block 106a1', the branch slits 134 in the second electrode block 106a2', the branch slits 134 in the third electrode block 106a3', and the branch slits 134 in the fourth electrode block 106a4' are, for example, 45°, 135°, 225°, and 315° respectively, but the present invention is not limited thereto.

Figure 8:
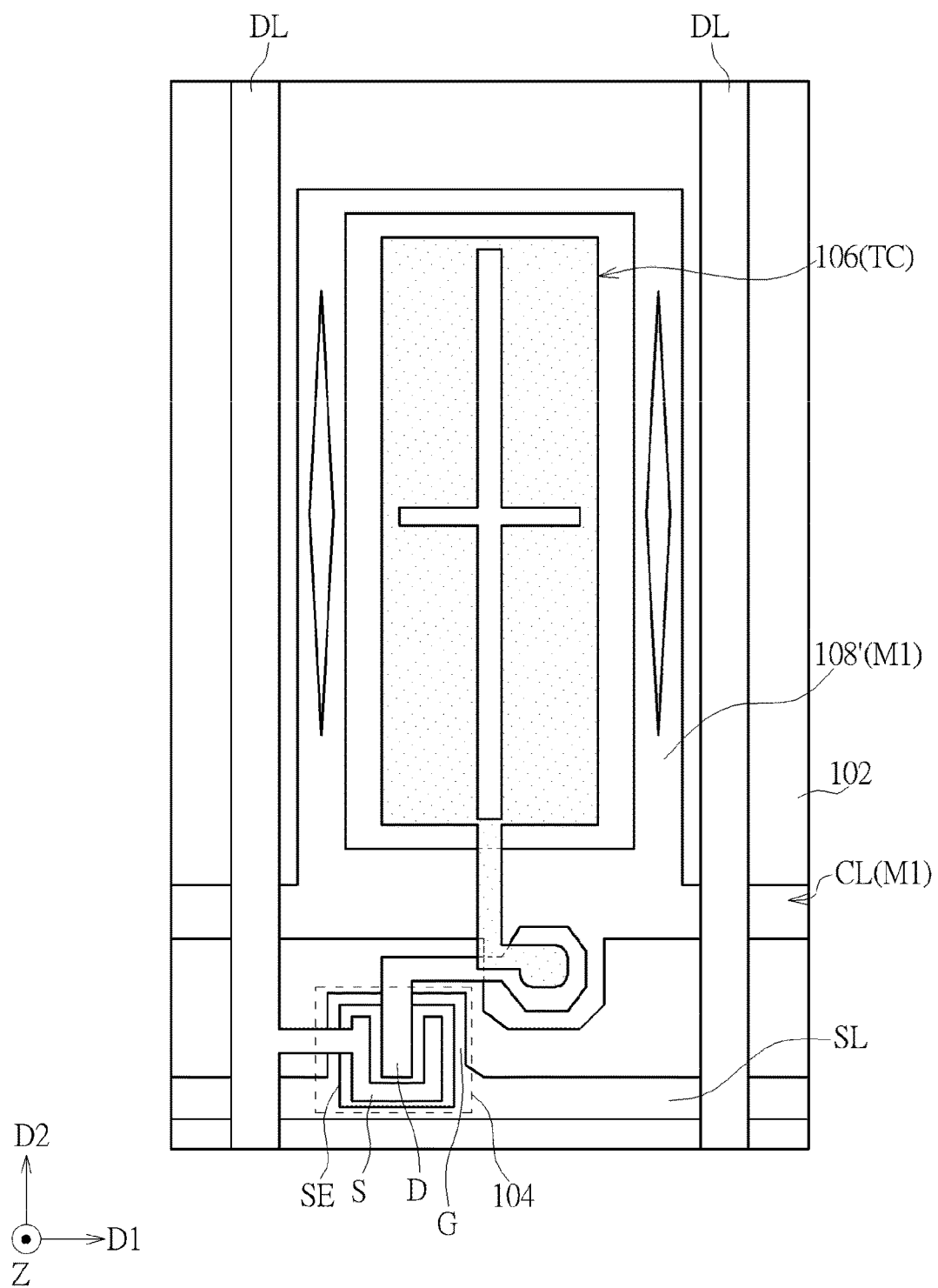
FIG. 8 is a top view of a display panel according to another variant embodiment of the first embodiment of the present invention.

Referring to FIG. 8, FIG. 8 is a top view of a display panel according to another variant embodiment of the first embodiment of the present invention. As shown in FIG. 8, this variant embodiment differs from the foregoing first embodiment in that a common electrode 108' may be not formed by a transparent conductive layer TC. Specifically, the common electrode 108' of a display panel 100' may be formed by the first patterned metal layer M1 the same as that of the gate, but the present invention is not limited thereto. In other words, the transparent conductive layer TC does not include a common electrode, a shield electrode of the common line CL is used as the common electrode 108'. Therefore, the common electrode 108' may be electrically connected to the common line CL. In this variant embodiment, the common electrode 108' does not overlap the pixel electrode 106 in the vertical projection direction. In still another variant embodiment, an inner side of the common electrode 108' may extend to overlap the pixel electrode 106.

The display panel in the present invention is not limited to the foregoing embodiments. Display panels in other exemplary embodiments of the present invention are sequentially described below. In addition, to facilitate the comparison between differences between the embodiments and simplify the description, like elements are denoted with a same reference sign in the following embodiments, the description is mainly made to the differences between the embodiments, and details of the repeated parts are not described herein again. In some embodiments below, to show the features of the present invention, elements such as a switch, a scan line, data lines, and a common line are omitted in the drawings, and merely a common electrode and a pixel electrode are drawn.

Figure 9:
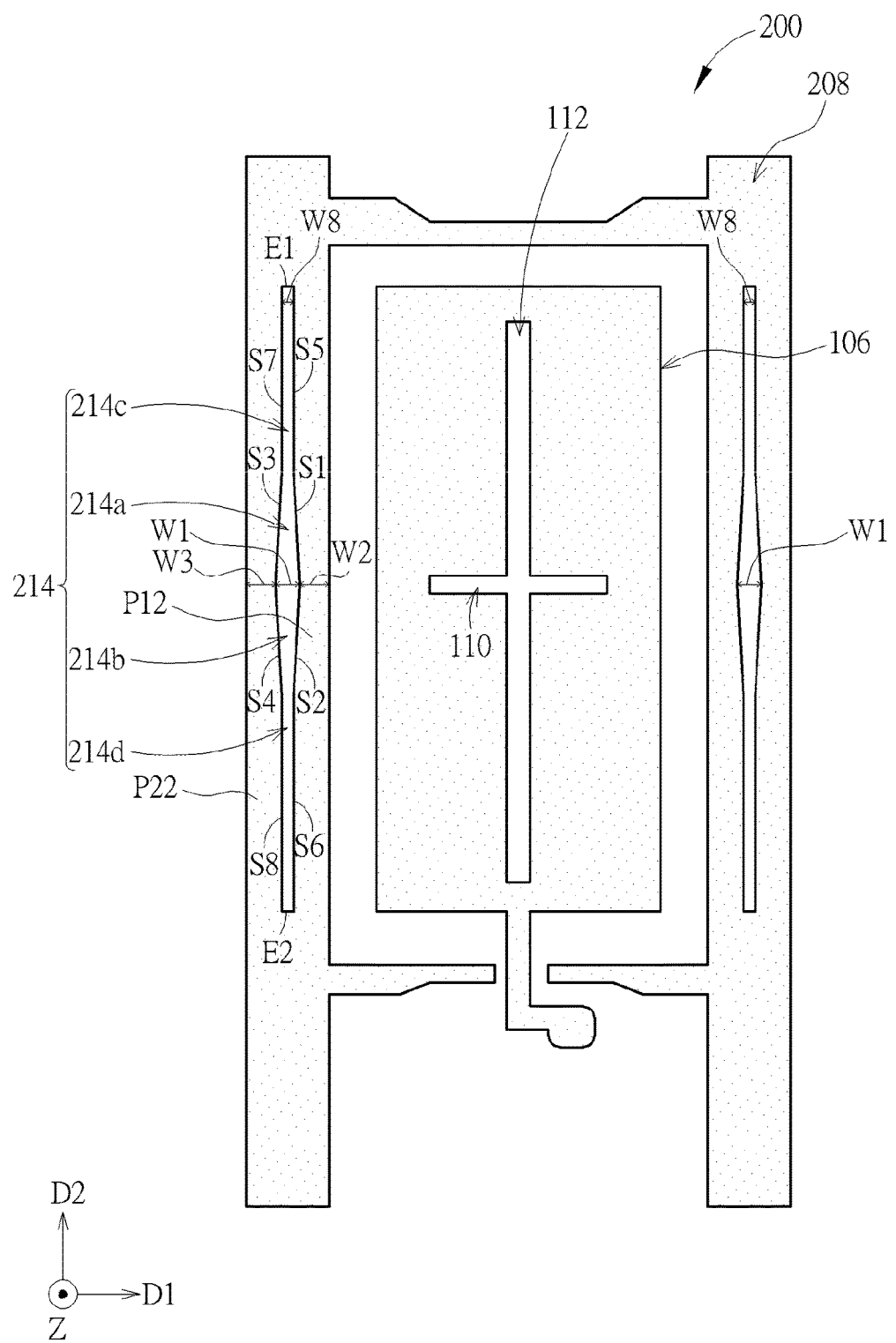
FIG. 9 is a top view of a display panel according to a second embodiment of the present invention.

Referring to FIG. 9, FIG. 9 is a top view of a display panel according to a second embodiment of the present invention. As shown in FIG. 9, this embodiment differs from the first embodiment in that smallest widths W8 of a first opening 214a and a second opening 214b of a display panel 200 provided in this embodiment are greater than zero and less than largest widths W1 thereof. In this embodiment, an opening 214 may further include a first rectangular opening 214c and a second rectangular opening 214d, the first rectangular opening 214c is connected to one end of the first opening 214a with the smallest width W8, and the second rectangular opening 214d is connected to one end of the second opening 214b with the smallest width W8. Therefore, the smallest widths W8 of the first opening 214a and the second opening 214b are not zero. In other words, a first portion P12 further includes a fifth side S5 connected to a first side S1, and a sixth side S6 connected to a second side S2, and a second portion P22 further includes a seventh side S7 connected to a third side S3, and an eighth side S8 connected to a fourth side S4. The fifth side S5 and the seventh side S7 may be two opposite sides of the first rectangular opening 214c, and therefore are spaced by a regular distance. The sixth side S6 and the eighth side S8 may be two opposite sides of the second rectangular opening 214d, and therefore are spaced by a regular distance. Therefore, the first side S1 is not connected to the third side S3, and the second side S2 is not connected to the fourth side S4. A distance between the fifth side S5 and the seventh side S7, that is, a width of the first rectangular opening 214c in the first direction D1, is the smallest width W8 of the opening 214. A distance between the sixth side S6 and the eighth side S8, that is, a width of the second rectangular opening 214d in the first direction D1, is the smallest width W8 of the opening 214. In addition, the common electrode 208 has a first end E1 and a second end E2, the first end E1 is connected to the fifth side S5 and the seventh side S7, and the second end E2 is connected to the sixth side S6 and the eighth side S8. A distance between the first end E1 and the second end E2 may be between 1/10 and 10/10 of a length of a pixel electrode 106 in the second direction D2.

Figure 10:
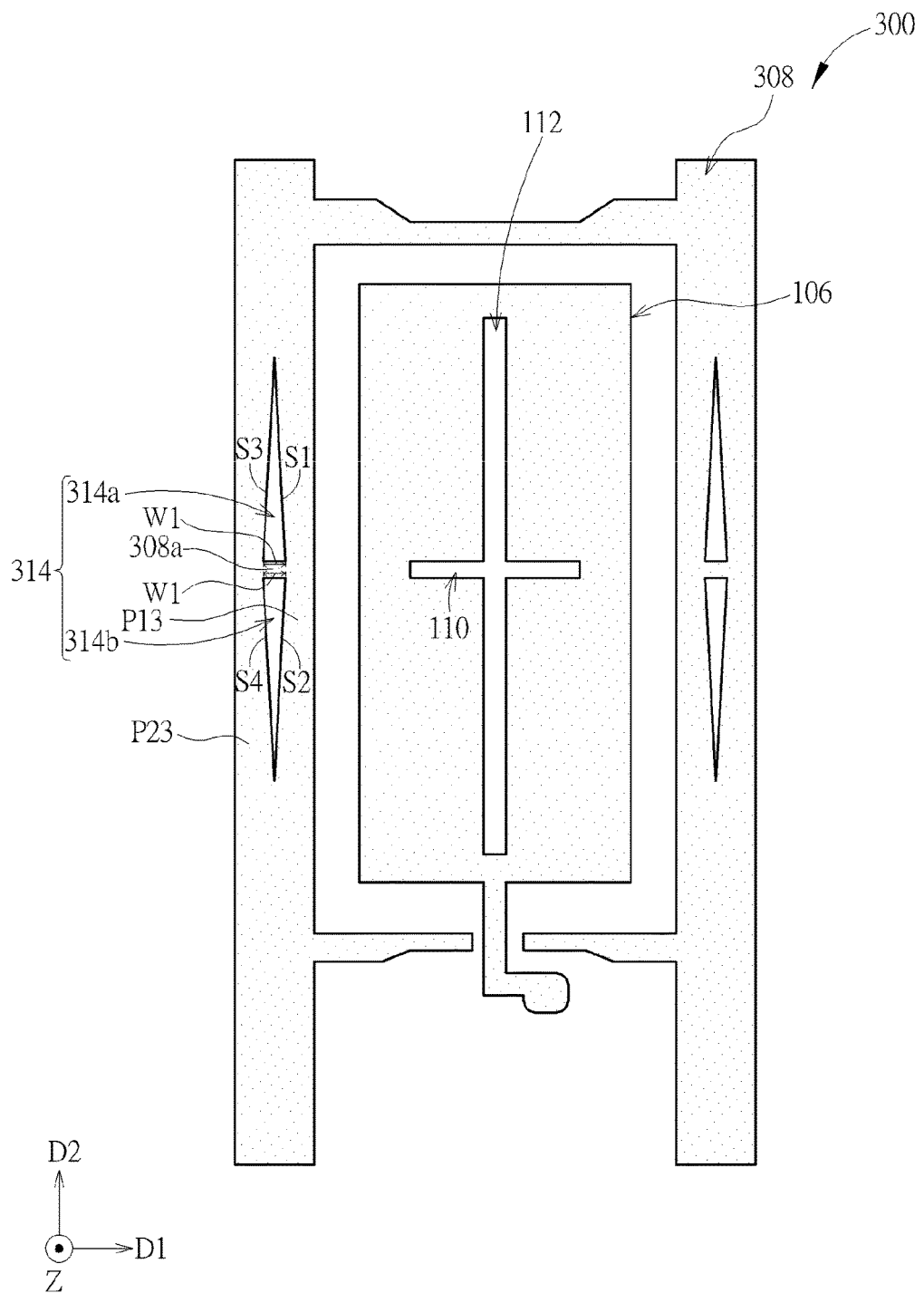
FIG. 10 is a top view of a display panel according to a third embodiment of the present invention.

Referring to FIG. 10, FIG. 10 is a top view of a display panel according to a third embodiment of the present invention. As shown in FIG. 10, this embodiment differs from the first embodiment in that a first opening 314a and a second opening 314b of a display panel 300 provided in this embodiment are not in communication with each other. Specifically, a common electrode 308 further includes a connection structure 308a, disposed between the first opening 314a and the second opening 314b to space the first opening 314a and the second opening 314b. In other words, the connection structure 308a is disposed between the first portion P13 and the second portion P23, and the connection structure 308a is located at an intersection of a first side S1 and a second side S2 and an intersection of a third side S3 and a fourth side S4, so that the connection structure 308a defines the opening 314 into a first opening 314a and a second opening 314b. In this embodiment, the connection structure 308a has two sides, one of which is connected to the first side S1 and the third side S3, and the other is connected to the second side S2 and the fourth side S4.

Figure 11:
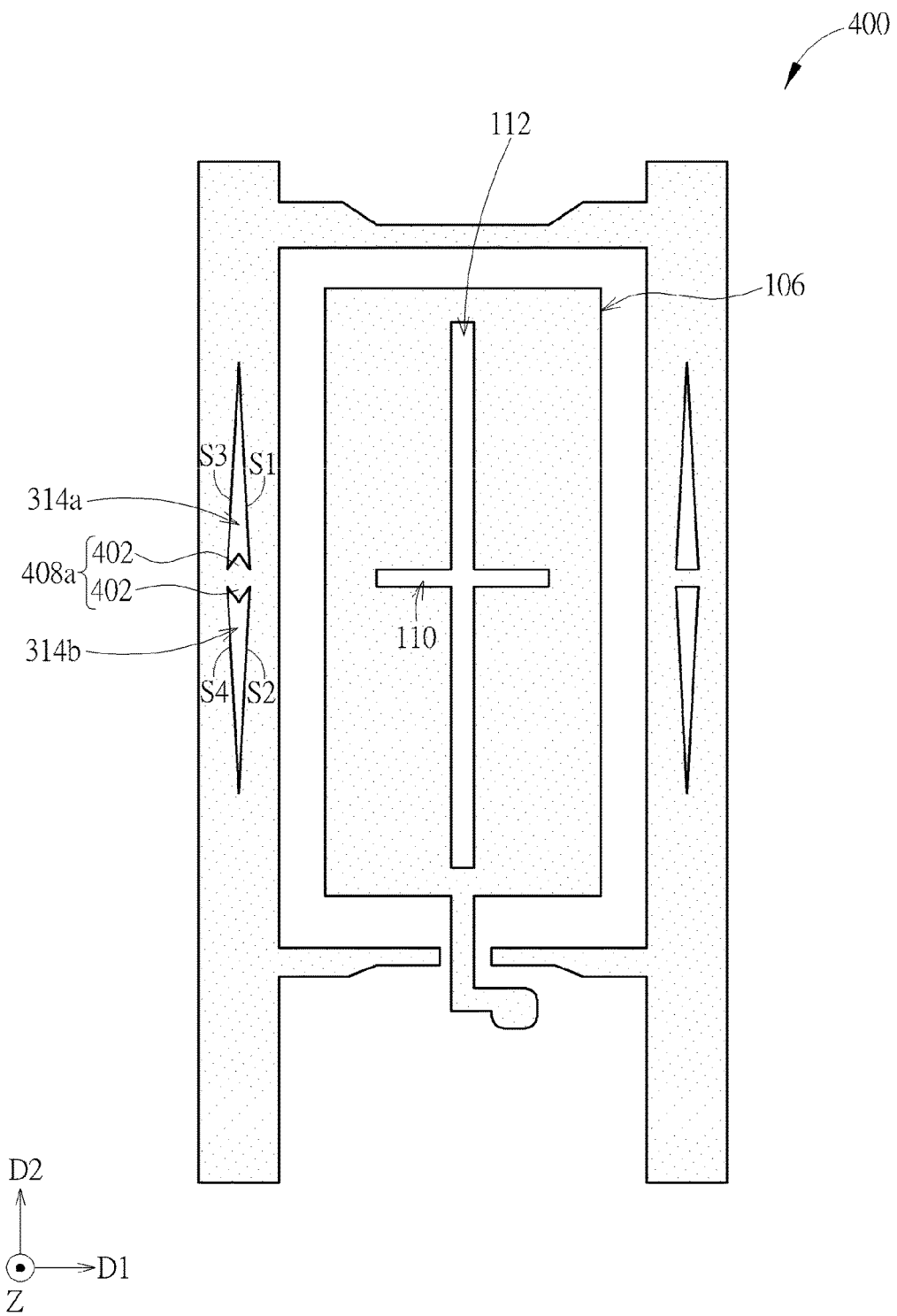
FIG. 11 is a top view of a display panel according to a fourth embodiment of the present invention.

Referring to FIG. 11, FIG. 11 is a top view of a display panel according to a fourth embodiment of the present invention. As shown in FIG. 11, this embodiment differs from the third embodiment in that a connection structure 408a of a display panel 400 provided in this embodiment may include two protruded portions 402, protruding towards a first opening 314a and a second opening 314b respectively. In this embodiment, a width of the protruded portion 402 protruding towards the first opening 314a in the first direction D1 is gradually smaller along the second direction D2, and a width of the protruded portion 402 protruding towards the second opening 314b in the first direction D1 is gradually smaller along the opposite direction of the second direction D2. For example, each protruded portion 402 may have two sides, which are connected to form an angle.

Figure 12:
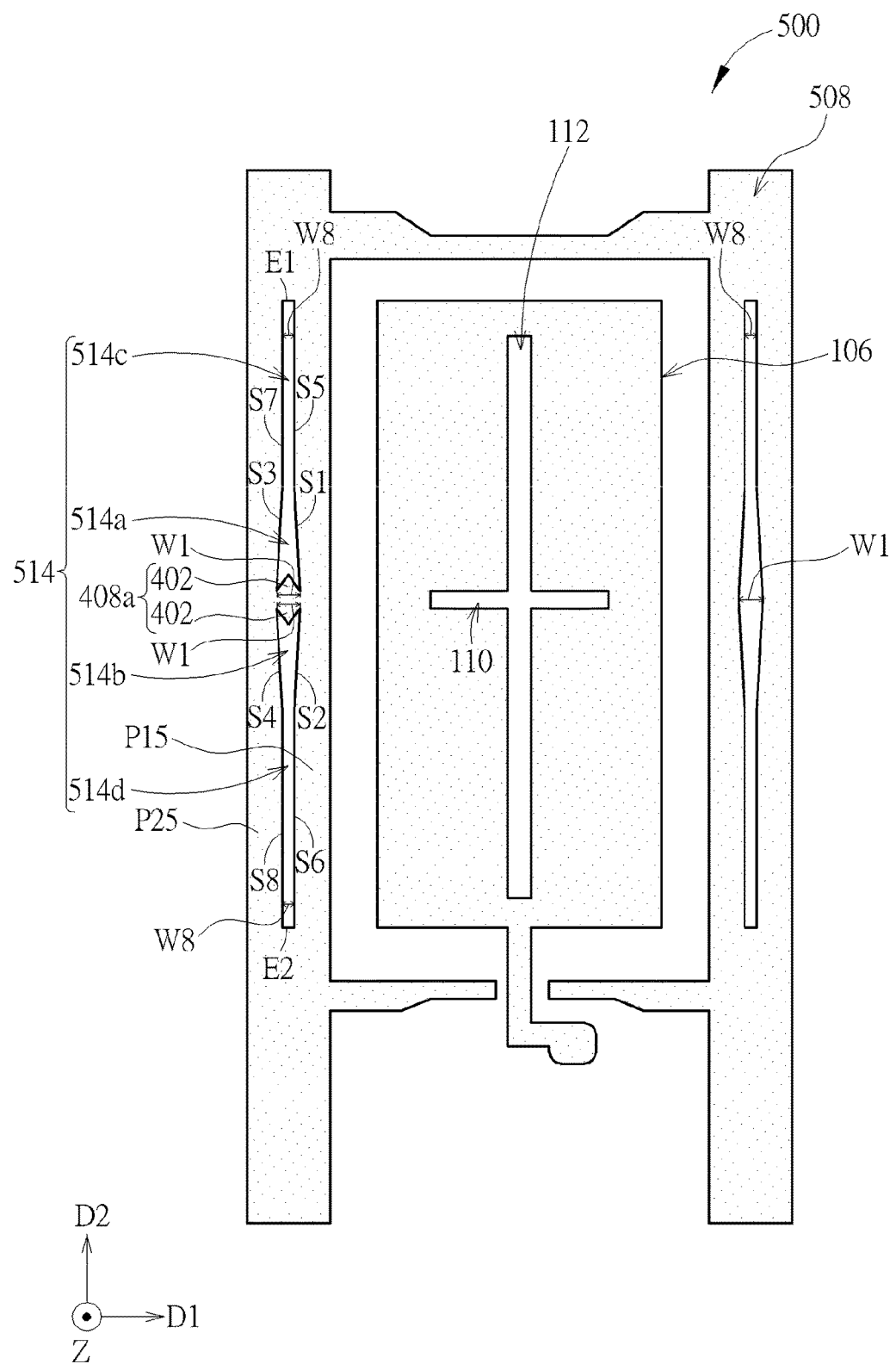
FIG. 12 is a top view of a display panel according to a fifth embodiment of the present invention.

Referring to FIG. 12, FIG. 12 is a top view of a display panel according to a fifth embodiment of the present invention. As shown in FIG. 12, this embodiment differs from the fourth embodiment in that smallest widths W8 of a first opening 514a and a second opening 514b of a display panel 500 provided in this embodiment are greater than zero and less than largest widths W1 thereof. In this embodiment, an opening 514 may further include a first rectangular opening 514c and a second rectangular opening 514d, the first rectangular opening 514c is connected to one end of the first opening 514a with the smallest width W8, and the second rectangular opening 514d is connected to one end of the second opening 514b with the smallest width W8. Therefore, the smallest widths W8 of the first opening 514a and the second opening 514b are not zero. In other words, a first portion P15 further includes a fifth side S5 connected to a first side S1, and a sixth side S6 connected to a second side S2, and a second portion P25 further includes a seventh side S7 connected to a third side S3, and an eighth side S8 connected to a fourth side S4. The fifth side S5 and the seventh side S7 may be two opposite sides of the first rectangular opening 514c, and therefore are spaced by a regular distance. The sixth side S6 and the eighth side S8 may be two opposite sides of the second rectangular opening 514d, and therefore are spaced by a regular distance. Therefore, the first side S1 is not connected to the third side S3, and the second side S2 is not connected to the fourth side S4. A distance between the fifth side S5 and the seventh side S7, that is, a width of the first rectangular opening 514c in the first direction D1, is the smallest width W8 of the opening 514. A distance between the sixth side S6 and the eighth side S8, that is, a width of the second rectangular opening 514d in the first direction D1, is the smallest width W8 of the opening 514. In addition, the common electrode 508 has a first end E1 and a second end E2, the first end E1 is connected to the fifth side S5 and the seventh side S7, and the second end E2 is connected to the sixth side S6 and the eighth side S8. A distance between the first end E1 and the second end E2 may be between 1/10 and 10/10 of a length of a pixel electrode 106 in the second direction D2.

Figure 13:
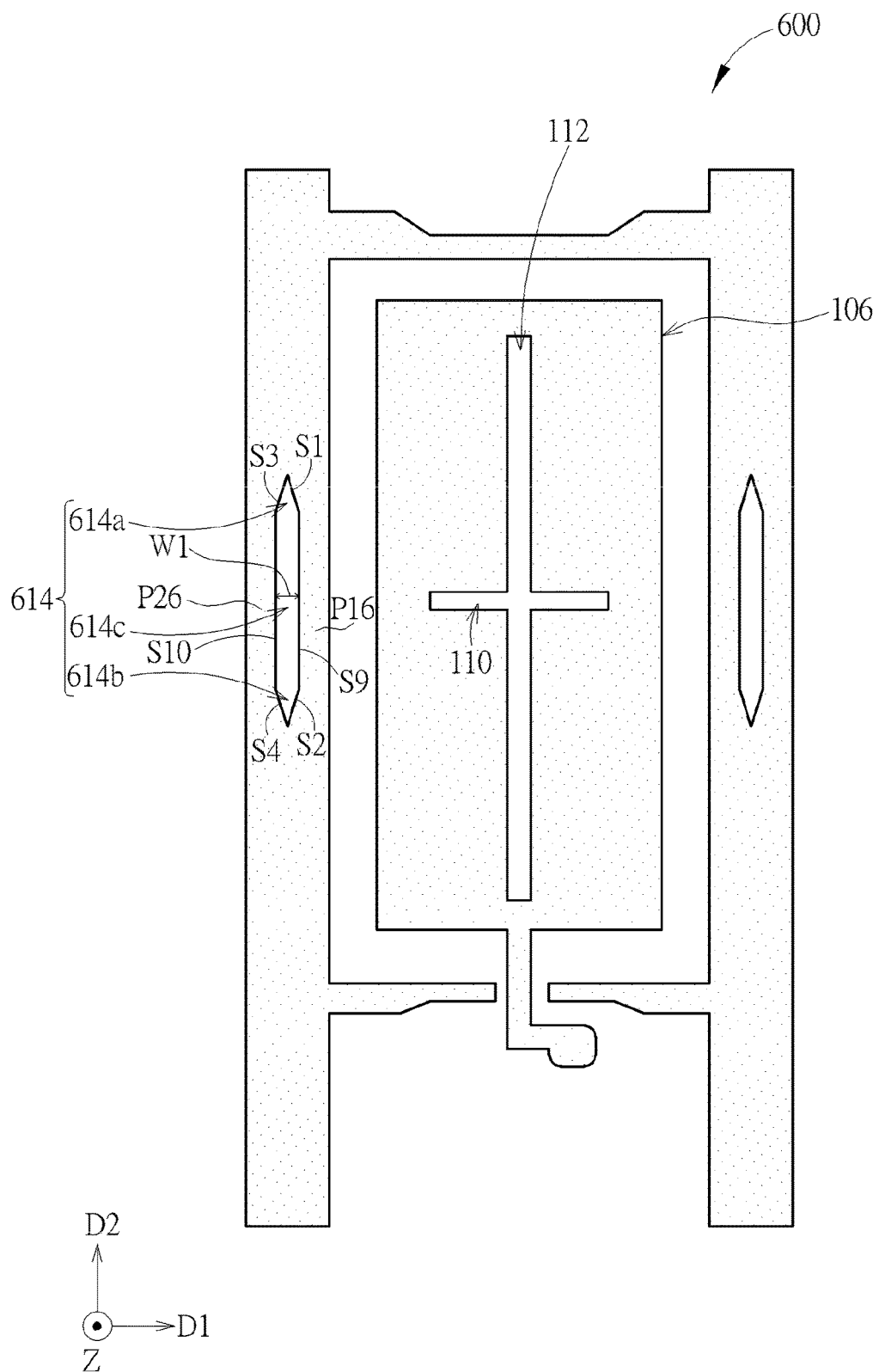
FIG. 13 is a top view of a display panel according to a sixth embodiment of the present invention.

Referring to FIG. 13, FIG. 13 is a top view of a display panel according to a sixth embodiment of the present invention. As shown in FIG. 13, this embodiment differs from the first embodiment in that an opening 614 of a display panel 600 provided in this embodiment further include a rectangular opening 614c, disposed between a first opening 614a and a second opening 614b. In other words, a first portion P16 further includes a ninth side S9 and a second portion P26 further includes a tenth side S10. The ninth side S9 is disposed between a first side S1 and a second side S2 to connect the first side S1 and the second side S2. The tenth side S10 is disposed between a third side S3 and a fourth side S4 to connect the third side S3 and the fourth side S4. The ninth side S9 and the tenth side S10 are spaced by a regular distance, and are two opposite sides of the rectangular opening 614c respectively. Therefore, the distance between the ninth side S9 and the tenth side S10, that is, a width of the rectangular opening 614c in the first direction D1, is the largest width W1 of the opening 614. A length of the ninth side S9 or the tenth side S10 in the second direction D2, that is, a length of the rectangular opening 614c in the second direction D2, is less than or equal to ½ of a length of the pixel electrode 106 in the second direction D2.

Figure 14:
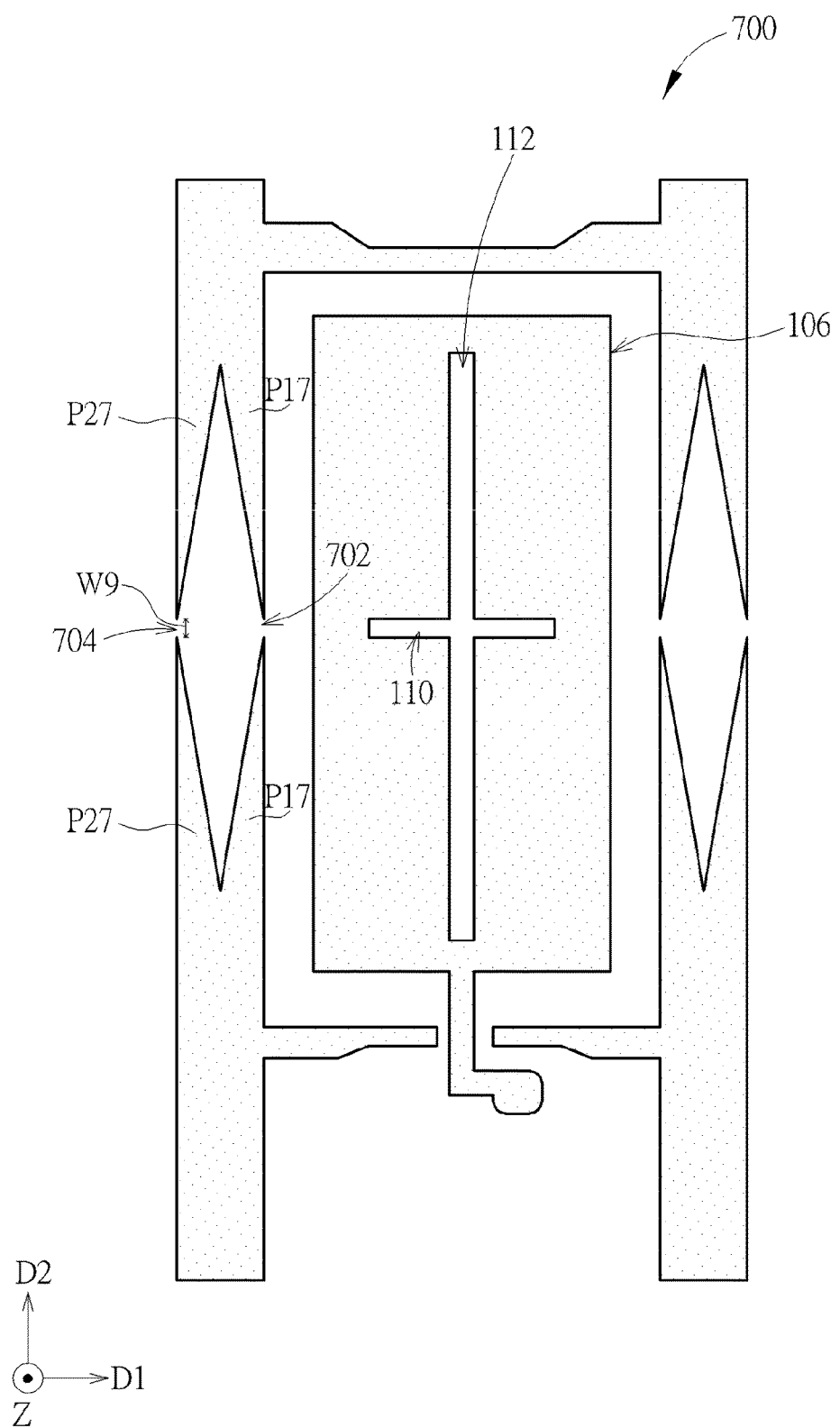
FIG. 14 is a top view of a display panel according to a seventh embodiment of the present invention.

Referring to FIG. 14, FIG. 14 is a top view of a display panel according to a seventh embodiment of the present invention. As shown in FIG. 14, this embodiment differs from the first embodiment in that in a display panel 700 provided in this embodiment, a first portion P17 has a first notch 702, a second portion P27 has a second notch 704, and the first notch 702 and the second notch 704 are located at the extending direction of the first slit 110. In other words, the first notch 702 divides the first portion P17 into two sub-portions, and the second notch divides the second portion P27 into two sub-portions. In addition, widths W9 of the first notch 702 and the second notch 704 in the second direction D2 may be respectively greater than zero and less than or equal to 6 micrometers.

To sum up, in the display panel in the present invention, a cross-shaped opening is designed in a pixel electrode, an opening is designed in a common electrode at one side of the pixel electrode, a part of the opening with a largest width is adjacent to an intersection of an extending direction of a first slit and the common electrode, and a width of the opening in a first direction is gradually smaller from the part of the opening with the largest width along a second direction and an opposite direction of the second direction. Therefore, during the alignment process, liquid crystal molecules corresponding to electrode blocks of the pixel electrode may show uniform and consistent alignment respectively, thereby reducing a width of a disclination line at an intersection of adjacent electrode blocks, and reducing disclination lines at a boundary area of the pixel electrode adjacent to the common electrode.

The foregoing descriptions are merely preferred embodiments of the present invention, and equivalent variations and modifications made in accordance with the claims of the present invention shall fall within the scope of the present invention.

What is claimed is:

1. A display panel, comprising:
    a first substrate;
    a switch, disposed on the first substrate;
    a pixel electrode, disposed on the first substrate and electrically connected to the switch, wherein the pixel electrode has a cross-shaped opening which comprises a first slit extending along a first direction and a second slit extending along a second direction and crossing the first slit; and
    a common electrode, disposed on the first substrate and being non-overlapping with the pixel electrode, wherein the common electrode comprises an opening having a largest width in the first direction, and said largest width aligns or is adjacent to an extending direction of the first slit.

2. The display panel according to claim 1, wherein the common electrode is spaced from the pixel electrode by a distance, and the opening is symmetrical with respect to the extending direction of the first slit.

3. The display panel according to claim 1, wherein the opening comprises a first opening and a second opening disposed at two sides of the extending direction of the first slit.

4. The display panel according to claim 3, wherein a width of the first opening in the first direction gradually decreases along with the second direction, and a width of the second opening in the first direction gradually decreases along with an opposite direction of the second direction.

5. The display panel according to claim 3, wherein the first opening and the second opening are in communication with each other.

6. The display panel according to claim 3, wherein the opening further comprises a rectangular opening, disposed between the first opening and the second opening, and a width of the rectangular opening in the first direction is the largest width.

7. The display panel according to claim 3, wherein the common electrode further comprises a connection structure, disposed between the first opening and the second opening to space the first opening and the second opening.

8. The display panel according to claim 1, wherein the common electrode and the pixel electrode are formed by a same patterned conductive layer.

9. The display panel according to claim 1, further comprising: a scan line and a data line, wherein the switch is electrically connected to the scan line and the data line, and the opening at least partially overlaps the data line in a vertical projection direction.

10. The display panel according to claim 1, further comprising:
    a second substrate;
    a liquid crystal layer, disposed between the first substrate and the second substrate, wherein the common electrode is disposed between the first substrate and the liquid crystal layer;
    a first polymer-stabilized alignment (PSA) layer, positioned between the first substrate and the liquid crystal layer; and
    a second PSA layer, positioned between the second substrate and the liquid crystal layer.

11. A display panel, comprising:
    a first substrate;
    a switch, disposed on the first substrate;
    a pixel electrode, disposed on the first substrate and electrically connected to the switch, wherein the pixel electrode has a cross-shaped opening which comprises a first slit extending along a first direction and a second slit extending along a second direction and crossing the first slit;
    a common electrode, disposed on the first substrate, and at least disposed at one side of the pixel electrode, wherein the common electrode comprises a first portion and a second portion that respectively extend along the second direction, the first portion has a first side and a second side, the second portion has a third side and a fourth side, and the first side, the second side, the third side, and the fourth side together form an opening, the opening having a largest width in the first direction;
    a second substrate; and
    a liquid crystal layer, disposed between the first substrate and the second substrate, wherein the common electrode and pixel electrode are disposed between the first substrate and the liquid crystal layer.

12. The display panel according to claim 11, wherein the first side and the second side are symmetrical with respect to an extending direction of the first slit, and the third side and the fourth side are symmetrical with respect to the extending direction of the first slit.

13. The display panel according to claim 11, wherein the first side is connected to the second side, the third side is connected to the fourth side, the first side and the third side are connected at one end point, and the second side and the fourth side are connected at the other end point.

14. The display panel according to claim 13, wherein a distance between the first side and the third side gradually decreases along with the second direction, and a distance between the second side and the fourth side gradually decreases along an opposite direction of the second direction.

15. The display panel according to claim 11, wherein the first portion further comprises a fifth side connected to the first side, and a sixth side connected to the second side, the second portion further comprises a seventh side connected to the third side, and an eighth side connected to the fourth side, the fifth side and the seventh side are spaced from each other, the sixth side and the eighth side are spaced from each other, the first side is not connected to the third side, and the second side is not connected to the fourth side.

16. The display panel according to claim 11, wherein the common electrode further comprises a connection structure, disposed between the first portion and the second portion, and the connection structure is located an intersection of the first side and the second side and an intersection of the third side and the fourth side, so that the connection structure defines the opening into a first opening and a second opening.

17. The display panel according to claim 11, wherein the first portion further comprises a ninth side, disposed between the first side and the second side to connect the first side and the second side; and the second portion further comprises a tenth side, disposed between the third side and the fourth side to connect the third side and the fourth side, the ninth side and the tenth side being spaced by a regular distance.

18. The display panel according to claim 11, wherein the first portion has a first notch, the second portion has a second notch, and the first notch and the second notch are located along the first direction.

19. The display panel according to claim 11, wherein the common electrode is disposed at two sides of the pixel electrode, the common electrode comprises another first portion and another second portion, and the pixel electrode is located between the first portion and the another first portion.

20. The display panel according to claim 11, further comprising: a scan line and a data line, wherein the switch is electrically connected to the scan line and the data line, and the opening at least partially overlaps the data line in a vertical projection direction.

* * * * *